United States Patent
Chang

(10) Patent No.: US 6,633,721 B2
(45) Date of Patent: Oct. 14, 2003

(54) VARIABLE OPTICAL ATTENUATOR

(75) Inventor: Yao-Hao Chang, Chung-Ho (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/940,226

(22) Filed: Aug. 27, 2001

(65) Prior Publication Data

US 2002/0176684 A1 Nov. 28, 2002

(30) Foreign Application Priority Data

May 25, 2001 (TW) .................................... 90208635 U

(51) Int. Cl.⁷ ................................................ G02B 6/00
(52) U.S. Cl. ...................................................... 385/140
(58) Field of Search ................................... 385/140, 23

(56) References Cited

U.S. PATENT DOCUMENTS 4,702,549 A  * 10/1987  Duck et al. ................. 385/140
5,127,084 A  * 6/1992   Takahashi ................... 385/114
6,130,984 A  * 10/2000  Shen et al. .................. 385/140

* cited by examiner

Primary Examiner—David V. Bruce
Assistant Examiner—Richard Kim
(74) Attorney, Agent, or Firm—WeiTe Chung

(57) ABSTRACT

A variable optical attenuator (10) includes a cover (2) and a housing (3) defining an interior space therebetween for accommodating an optical module (4) and a reciprocating device (5). The reciprocating device includes a carrier (53) mounted to and driven by a screw rod (55) between opposite extreme positions. A filter (6) having a varying optical density gradient is attached to the carrier (53) to be movable therewith. The optical module includes input and output optical fibers (45, 46). Light signal goes from the input fiber transmits through the filter and reflected by a reflector (42) back to the output fiber (46). By moving the filter with respect to an optical path between the reflector and the input and output fibers, the light signal is attenuated to different extent due to the varying density of the filter. The carrier forms stoppers (511, 512) on opposite sides thereof for abuttingly engaging sidewalls of the housing for preventing over-movement of the carrier with respect to the housing.

18 Claims, 6 Drawing Sheets

VARIABLE OPTICAL ATTENUATOR

BACKGROUND OF THE INVENTION

1. Field of the Invention

The present invention relates to a variable attenuator for use in optical fiber communication and optical network technology, and particularly to a variable attenuator with stopper mechanism.

2. Description of Related Art

An optic attenuator is a passive optical component for reducing optical power propagating in an optic fiber, and may perform fixed or variable attenuation. Optical attenuators are widely used in optical transmission systems and optical networks.

A general variable attenuator has a filter. The filter has an effective filter region disposed in the optical path between a collimator and a reflector. The filter has a filter density which varies from a low density region to a high density region. The transmitted light is attenuated to different intensities by linear movement of the filter with respect to the optical path of the light.

For example, U.S. Pat. No. 4,702,549 describes a variable optical attenuator comprising two optical fibers having their ends aligned to and opposite to each other and a filter element mounted on a reciprocating means for being selectively positioned between the fiber ends. The filter is not perpendicular to the axis of alignment of the fiber ends. The variable attenuator has a manually-operated screw rod to control the attenuation of the transmitted light. A disadvantage associated with such as conventional design is that no stopper is employed to stop the operation of the device whenever needed. Controlling the angular position of the screw rod while rotating the screw rod near the highest and lowest attenuation positions is difficult. The screw rod can be easily over-rotates at positions near the highest and lowest attenuation. Devices of U.S. Pat. No. 4,989,938 and U.S. Pat. No. 4,904,044 share the same problem.

U.S. Pat. Nos. 6,144,794 and 6,130,984 each describe a variable attenuator using reciprocating means to adjust the position of the filter in the variable attenuator. Both employ an electrical control system. Although electrical control systems operate with higher precision, their cost is high and they greatly increase the size of the device.

The present invention provides a variable attenuator incorporating a stopper structure in a reciprocating means for preventing over-movement of the attenuation filter beyond the highest and the lowest attenuation positions.

SUMMARY OF THE INVENTION

An object of the present invention is to provide an improved variable attenuator having a stopper mechanism. The stopper mechanism prevents the filter from moving beyond its end-point positions.

A variable optical attenuator of the present invention comprises a cover, a housing an optical module and a reciprocating means.

The housing has a hollowed-out interior with an inner cavity in a lower end of the housing. A pair of locating slots define lateral sides of the inner cavity. An inner sidewall defines a forward boundary of the inner cavity. A side hole communicates between one of the locating slots and an outside wall of the housing. A fixing groove and a supporting portion are formed adjacent the other locating slot.

The optical module comprises a frame, a reflector and a collimator. The frame has a groove with an inner wall, and a through hole communicating with the groove. The reflector is fixed on the inner wall of the frame and is disposed coaxially with the through hole. The collimator is positioned in the through hole and fixes ends of an input optical fiber for carrying the transmission optical signals to the attenuator, an output optical fiber for receiving the resulting attenuated transmission optical signals from the attenuator.

The reciprocating means comprises a carrier for carrying the filter, a spring element, and a screw rod. A pair of stoppers is formed at two opposite sidewalls of the carrier. A fixing groove is formed at one of the other two opposite sidewalls. The spring element has a fixing portion and a mating portion. The screw rod has a screw portion at its middle and a holding portion at each end.

When assembled, the carrier moves lengthwise along the screw rod when the screw rod is rotated. The filter is fixed onto the carrier and moves along with the carrier. The fixing portion of the spring element is inserted into the fixing groove. The mating portion of the spring element abuts against the inner sidewall and moves along the inner sidewall when the carrier is moved.

By rotating the screw rod first in one direction and then in the reverse direction, the carrier with the filter can be made to move first toward one side and then toward another side of the housing. The direction of movement of the filter is perpendicular to the path of the input and output light. The filter has a filter density which varies between a lower density region and a higher density region along a linear filter axis. When the carrier arrives at one end of the screw rod, the stoppers abut with surfaces of the corresponding locating slot and the part of the filter penetrated by the input and output light will be either the lower density region or the higher density region.

Other objects, advantages and novel features of the invention will become more apparent from the following detailed description when taken in conjunction with the accompanying drawings.

DETAILED DESCRIPTION OF THE INVENTION

Figure 1:
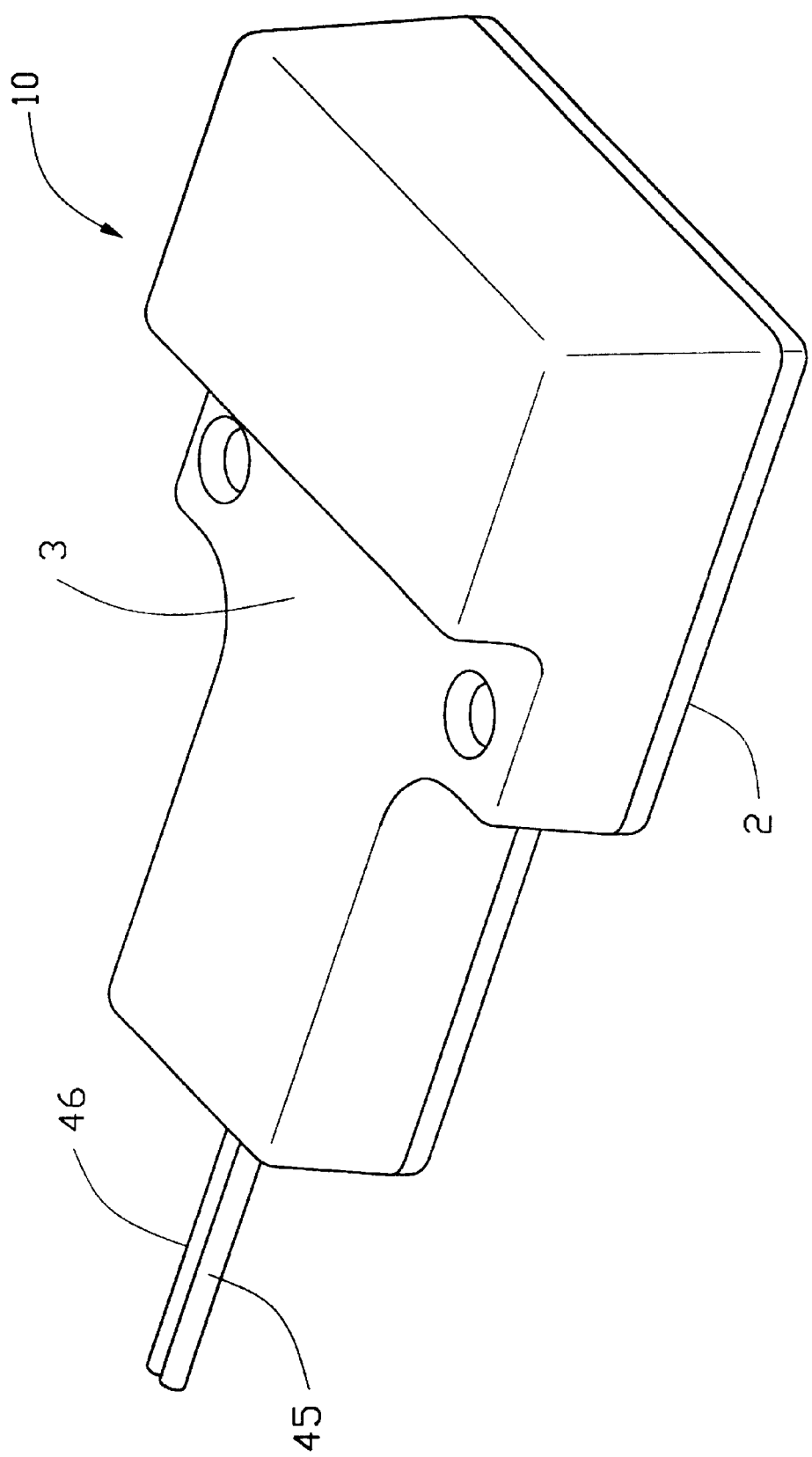
FIG. 1 is a perspective, bottom-aspect, assembled view of a variable optical attenuator of the present invention.
Figure 2:
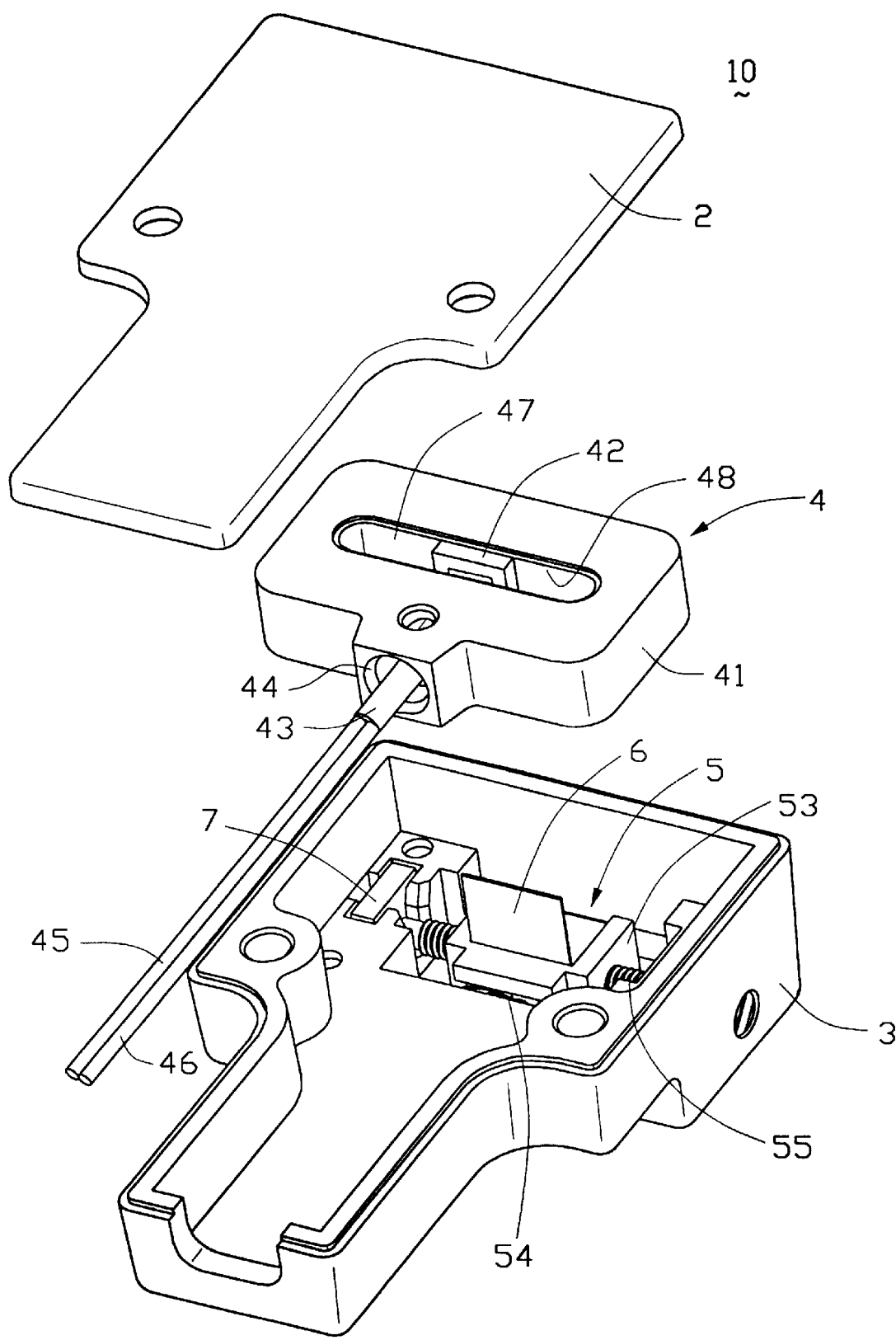
FIG. 2 is an exploded view of the variable optical attenuator of FIG. 1 from a top-aspect.

As shown in FIG. 1 and FIG. 2, a variable optical attenuator 10 of the present invention comprises a cover 2, a housing 3, an optical module 4, a reciprocating means 5, a filter 6 and a fixer 7.

Figure 3:
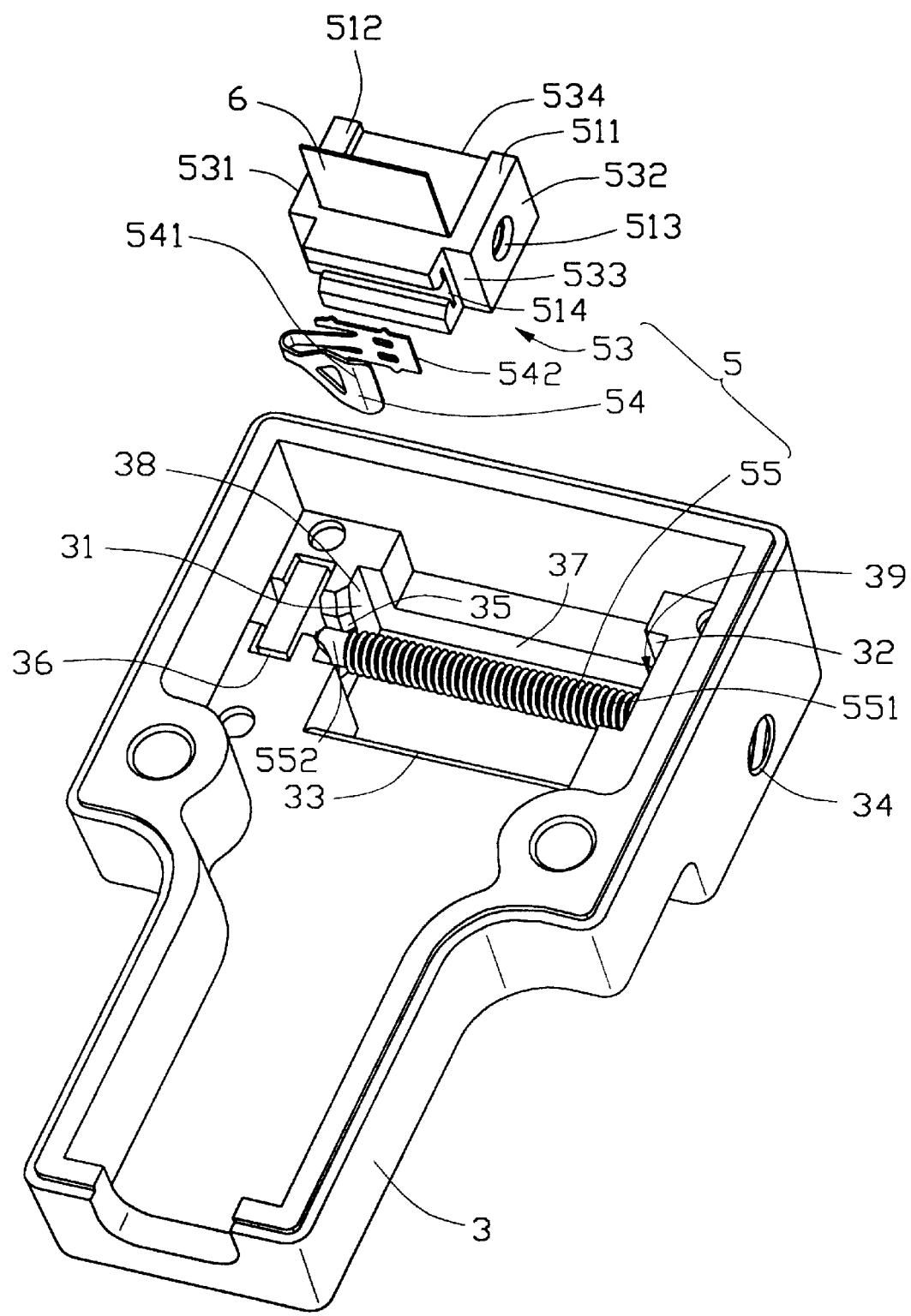
FIG. 3 is a partially exploded detail of FIG. 2, without an optical module or a cover.

Also referring to FIG. 3, the housing 3 defines an inner cavity 37 and forms a pair of locating slots 31, 32 positioned on opposite sides of and communicating with the inner cavity 37. The cavity 37 is also defined by an inner sidewall 33. A side hole 34 is defined in one side (not labeled) of the inner cavity 37. A groove 36 is defined in the housing 3 and separated from the inner cavity 37 by two supporting portions 35, which are formed at a second side (not labeled)

of the inner cavity 37. The fixing groove 36 communicates with the inner cavity 37 via a passageway (not labeled) defined between the two supporting portions 35.

As shown in FIG. 2, the optical module 4 comprises a frame 41, a reflector 42 and a collimator 43. The frame 41 has a groove 47 defined in a middle portion thereof. The groove 47 is also defined by an inner wall 48. A through hole 44 is defined in a front side (not labeled) of the frame 41. The reflector 42 is fixed to the inner wall 48 of the frame 41 and is opposite to the through hole 44. An input optical fiber 45 and an output optical fiber 46 are fixed to the collimator 43, which is received and fixed in the through hole 44.

The filter 6 has a varying optical density gradient along at least one of its dimensions. As shown in FIG. 3, the reciprocating means 5 for moving the filter 6 comprises a carrier 53, a spring element 54, and a screw rod 55. The carrier 53 carries the filter 6 and moveably mounts on the screw rod 55. The carrier 53 has a first sidewall 531, a second sidewall 532, a third side wall 533, and a fourth sidewall 534. A pair of stoppers 511, 512 are formed on the first and second side walls 531, 532 for preventing the carrier 53 from over-movement. A fixing groove 514 is defined in the third sidewall 533. The spring element 54 has a fixing portion 542 received and retained in the fixing groove 514 of the frame 41 and a mating portion 541. The screw rod 55 has a threaded portion 551 formed along a middle portion thereof and a holding portion 552 at each end thereof.

As shown in FIGS. 2 and 3, in assembly, the screw rod 55 is threadedly engaged with the screw hole 513 of the carrier 53. The filter 6 is fixed onto the carrier 53. The fixing portion 542 of the spring element 54 is inserted into the fixing groove 514 of the carrier 53. One holding portion 552 of the screw rod 55 is received in the side hole 34 of the housing 3. The other holding portion 552 is disposed in the passageway (not labeled) between the two supporting portions 35 and extends into the fixing groove 36. The carrier 53 is thereby positioned within the inner cavity 37 and the mating portion 541 of the spring element 54 abuts against the inner sidewall 33 of the housing 3. The mating portion 541 slides on the inner sidewall 33 when the carrier 53 moves. The fixer 7 is then received and retained in the fixing groove 36 for holding the holding portion 552 of the screw rod 55 in position thereby securely fixing the screw rod 55. The screw rod 55 is rotatable about a longitudinal axis thereof. The optical module 4 is assembled in the housing 3 with the filter 6 protruding into the groove 47 in front of the reflector 42. The input optical fiber 45 and output optical fiber 46 protrude from a front end of the housing 3. The cover 2 is fixed to a top surface of the housing 3.

Figure 4:
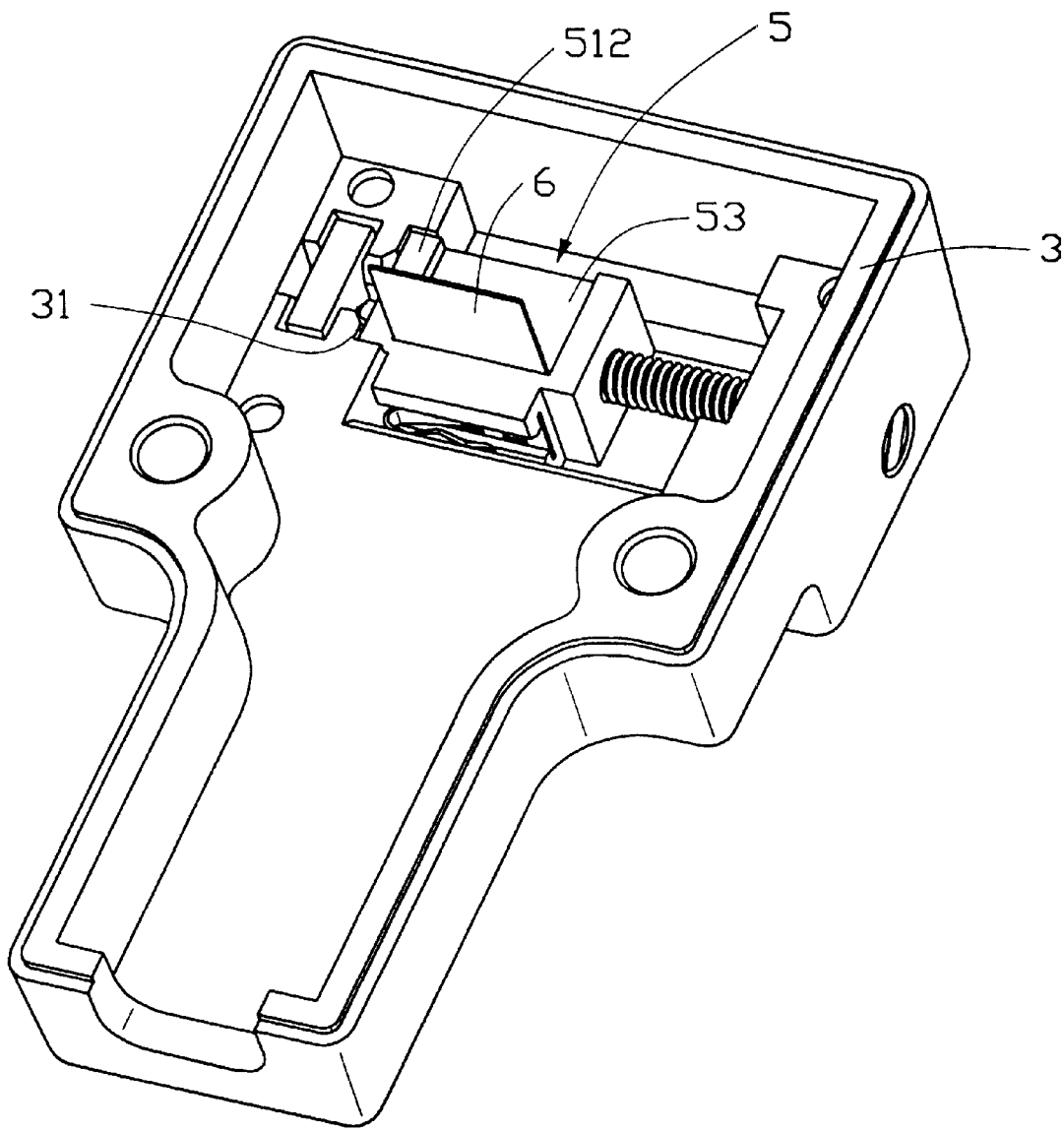
FIG. 4 is an assembled view of FIG. 3 in a first position.
Figure 5:
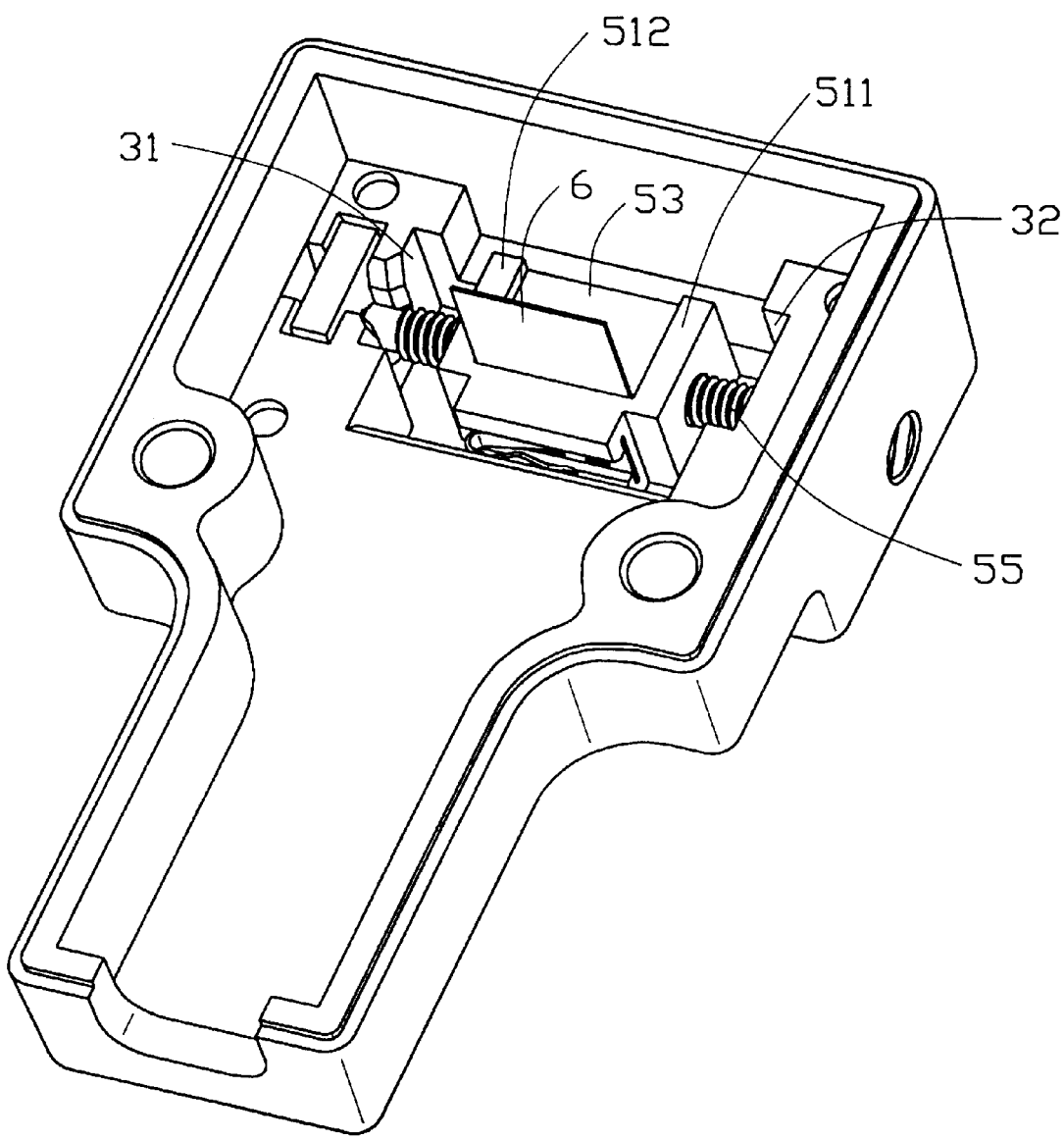
FIG. 5 is an assembled view of FIG. 3 in a second position.
Figure 6:
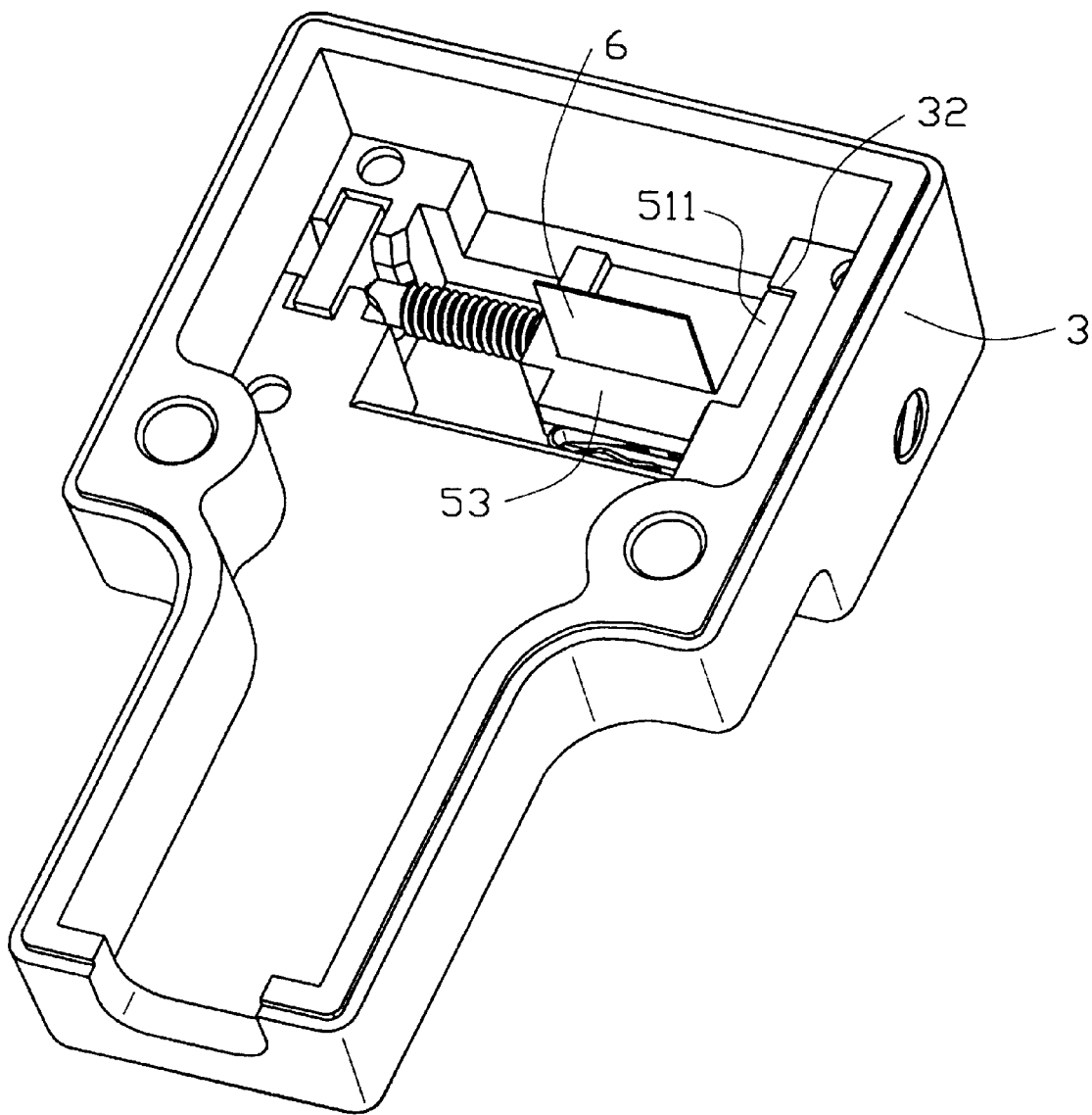
FIG. 6 is an assembled view of FIG. 3 in a third position.

Referring to FIGS. 4–6, in use, optical signals are transmitted from the input optical fiber 45 through the collimator 43 and through the groove 47 to pass through the filter 6. These optical signals are reflected by the reflector 42, and pass again through the filter 6 and the collimator 43, in a reverse direction, and are transmitted through the output optical fiber 46. When the screw rod 55 is rotated in one direction about its longitudinal axis, the carrier 53 and filter 6 move toward the locating slot 32. When the screw rod 55 is rotated in an opposite direction, the carrier 53 and the filter 6 move toward the locating slot 31. The direction of movement of the filter 6 is perpendicular to the path of the input and output optical signals. The filter 6 has an optical density gradient which varies between a low density region and a high density region along a direction parallel to the direction of movement of the filter 6. When the carrier 53 moves to either end of the screw rod 55, the stoppers 511, 512 of the carrier 53 abut against surfaces 39, 38 defining outside boundaries of the locating slots 32, 31, respectively, and the filter stops with either the low density region or the high density region being in the path of transmission of the optical signals coming from the input optical fiber 45 and going to the output optical fiber 46.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A variable optical attenuator for attenuating optical signals input from an input optical fiber and output to an output optical fiber comprising:

a housing having at least one locating slot defined therein;
   a filter having a varying optical density gradient along at least one dimension thereof; and
   a reciprocating means coupled to the filter and moveable within the housing to move the filter along the at least one dimension over which the optical density gradient of the filter varies, said reciprocating means having at least one stopper abuttingly engageable with a surface defining an outside boundary of the at least one locating slot of the housing, thereby preventing the reciprocating means from moving beyond a predetermined point.

2. The variable optical attenuator as claimed in claim 1 further comprising an optical module and said optical module comprising a frame.

3. The variable optical attenuator as claimed in claim 2, wherein said frame has a groove defined therein for movably receiving the filter.

4. The variable optical attenuator as claimed in claim 3 further comprising a collimator and said collimator retaining ends of the input optical fiber and the output optical fiber and being positioned in the through hole.

5. The variable optical attenuator as claimed in claim 4 further comprising a reflector which is fixed on an inner wall of the groove substantially opposite to and aligned to the collimator.

6. The variable optical attenuator as claimed in claim 5, wherein the filter is positioned between the reflector and the collimator.

7. The variable optical attenuator as claimed in claim 1, wherein the housing defines two locating slots on opposite sides of the housing.

8. The variable optical attenuator as claimed in claim 1, wherein said reciprocating means has a carrier, a spring element and a screw rod.

9. The variable optical attenuator as claimed in claim 8, wherein the reciprocating means forms two stoppers on opposite sides of the carrier.

10. The variable optical attenuator as claimed in claim 8, wherein the filter is mounted on the carrier.

11. The variable optical attenuator as claimed in claim 8 further comprising a fixer retaining the screw rod in place within the housing.

12. A variable optical attenuator for attenuating optical signals input from an input optical fiber and output to an output optical fiber comprising:

a housing having at least one locating slot defined therein;
   an optical module having a reflector fixed therein, the reflector being disposed in an optical path between the input fiber and the output fiber;

a filter having a varying optical density gradient along at least one dimension thereof, the filter being movably disposed in the optical path between the reflector and the input fiber and the output fiber;

a reciprocating means for moving the filter along the at least one dimension over which the optical density gradient varies, such movement adjusting level of attenuation of the optical signals, said reciprocating means having at least one stopper for abuttingly mating with the at least one locating slot to prevent the reciprocating means from moving to a point where the filter is no longer located in the optical path between the reflector and the input fiber and the output fiber.

13. The variable optical attenuator as claimed in claim 12, wherein the optical module comprises a frame and a collimator.

14. The variable optical attenuator as claimed in claim 13, wherein the frame has a groove defined through at least one side of the frame and a through hole defined through another side of the frame and in communication with the groove.

15. The variable optical attenuator as claimed in claim 12, wherein the reciprocating means has a carrier, a spring element and a screw rod.

16. The variable optical attenuator as claimed in claim 15, wherein the carrier has a stopper formed at each of two opposite sides thereof.

17. The variable optical attenuator as claimed in claim 15, wherein the filter is mounted on the carrier.

18. The variable optical attenuator as claimed in claim 15 further comprising a fixer retaining the screw rod in place within the housing.

* * * * *